Figure 1:
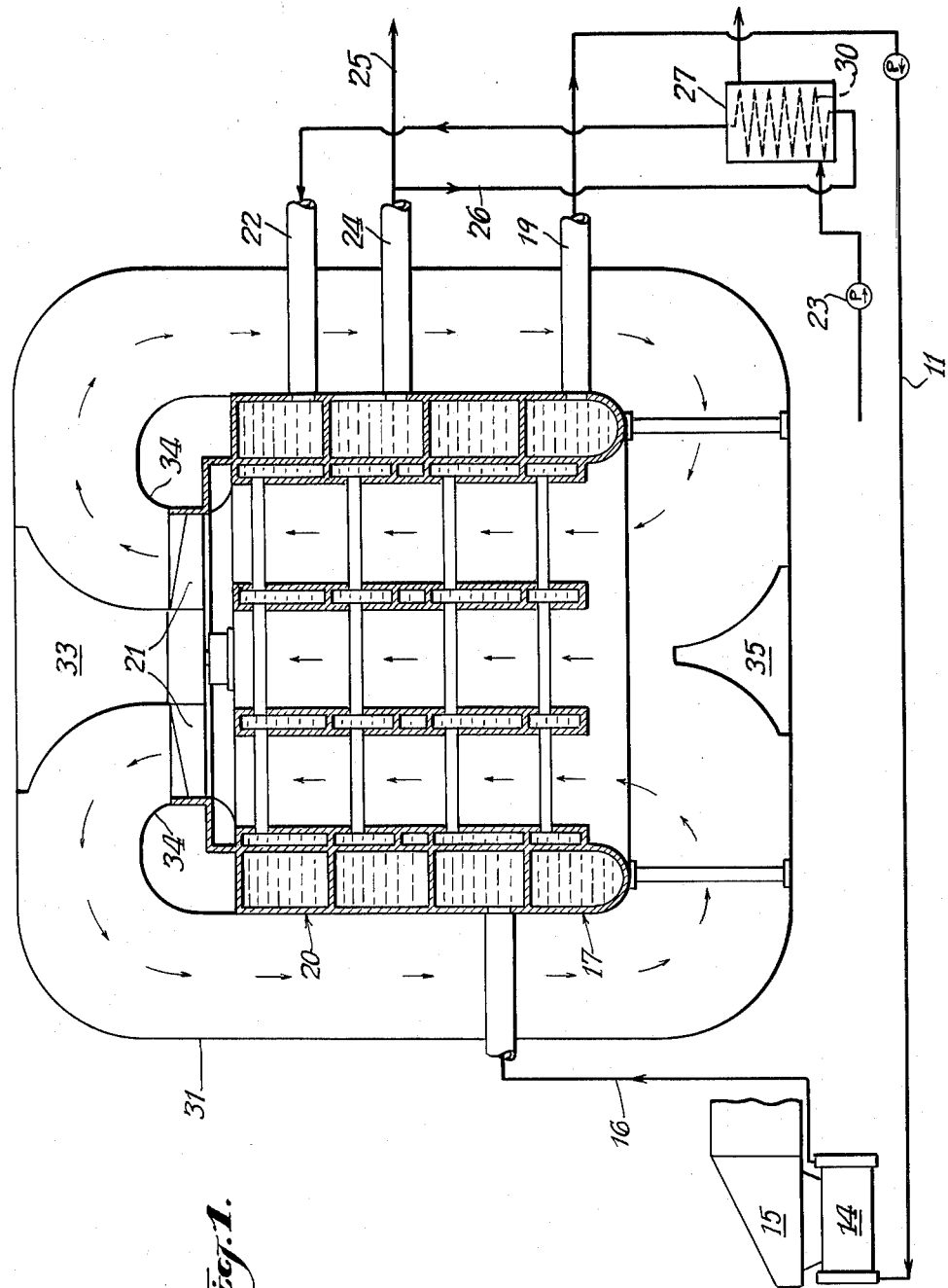

Oct. 26, 1965   J. LICHTENSTEIN ETAL   3,214,351
FALLING FILM CONVECTIVE DISTILLATION UNIT WITH
DIRECT CONTACT CONDENSATION
Filed Feb. 26, 1962   2 Sheets-Sheet 1

INVENTORS.
JOSEPH LICHTENSTEIN.
BY BENEDICT J. BUCALO.

Ward, Neal, Haselton, Orme & McElhannon
ATTORNEYS.

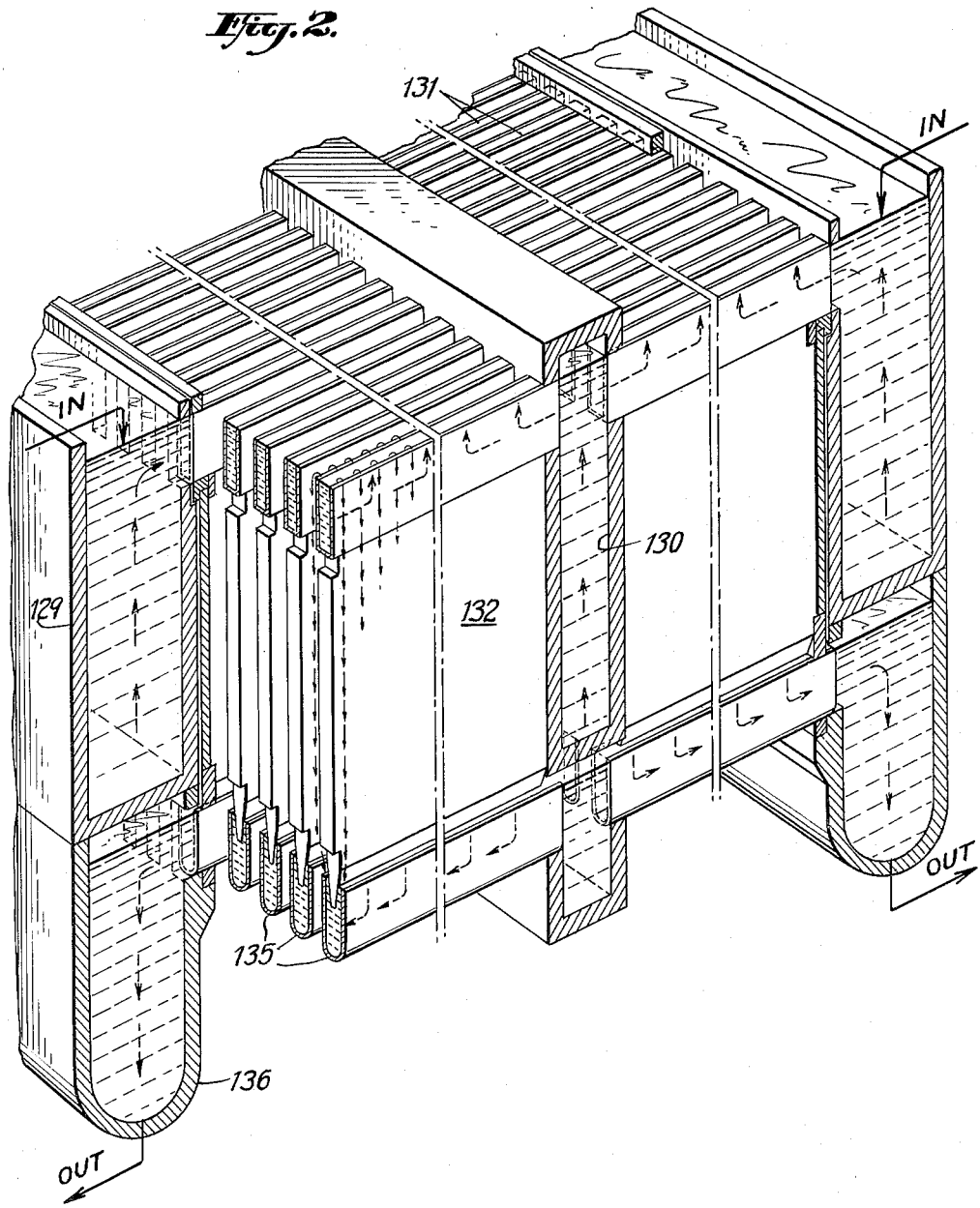

United States Patent Office 3,214,351
Patented Oct. 26, 1965

3,214,351
FALLING FILM CONVECTIVE DISTILLATION UNIT WITH DIRECT CONTACT CONDENSATION
Joseph Lichtenstein, Bayside, and Benedict J. Bucalo, Babylon, N.Y., assignors, by mesne assignments, to Saline Water Conversion Corporation, a corporation of New York
Filed Feb. 26, 1962, Ser. No. 175,540
2 Claims. (Cl. 202—185)

This invention relates to saline water conversion systems, and more particularly, to a method and apparatus for converting saline water to potable fresh water.

Systems of this class have been known in the art and have frequently involved flash vaporization or bubble towers, both of which are used in conjunction with condensing means, for effecting evaporation of the saline water and condensation of the vapor thus formed. While these and other known systems embody varying degrees of merit, they do present some very considerable problems which combine to militate against the commercial production of potable fresh water at an acceptable cost.

Actually, the basic difficulty with known systems is one of economy. Accordingly, an economical system of this class has long been sought after and a considerable amount of effort has been expended to reduce initial and operating costs of such systems.

By way of overcoming this serious disadvantage a substantial contribution to the art has been made by Joseph Lichtenstein, one of the applicants herein, by the invention shown and described in his co-pending application Serial No. 109,648, filed May 12, 1961 an entitled "Saline Water Conversion."

That application teaches a method and apparatus utilizing air under atmospheric conditions as a moisture carrier for the conversion of saline water to potable fresh water, which materially reduces the initial cost of the system as well as its operating and maintenance costs, as compared with earlier systems known to applicants, thus providing potable fresh water at commercially desirable rates. However, that system necessarily involves several uncontrollable factors such as the cooling water temperature, the nature of the moisture carrying gas, which is always atmospheric air, and of course the temperature and humidity of that air.

By our present invention we contribute a system which represents an improvement over the system of the aforementioned application Serial No. 109,648 to the extent that the operating costs, and therefore the unit costs per thousand gallons of fresh potable water are even further reduced beyond the substantial reductions already achieved by that system.

In essence, our invention resides in a method and apparatus similar to that of the aforesaid application Serial No. 109,648 but in which the cooling towers are contained within an outer envelope or enclosure permitting close control of the atmosphere utilized in the system.

The enclosure permits us to select our atmosphere and to maintain it at a predetermined pressure which may be less than atmospheric. In this way, while we cannot control the cooling water temperature since, as will be seen, this depends upon an exterior source such as the sea, for example; nevertheless, we are able to employ the most suitable gas or vapor as our moisture carrier, and to maintain the most suitable pressure in the system, thereby reducing the cost of the fresh water product to its absolute minimum. As the system is enclosed, and the pressure may be less than atmospheric, the weight of gas carrying moisture is reduced so that the heat required to raise the temperature of the gas, the power necessary for circulating the gas, and the total area of film surface in each of the towers are all reduced wherefore the extra cost of the enclosure is more than offset. While our concept contemplates the utilization of any suitable gas or vapor, we prefer to use air as our moisture carrier for the following reasons. First the ideal gas (and by the term "gas" we intend to include vapor) must be of relatively low density so as to minimize the amount of energy required to move it; and second, it must have a relatively low specific heat since this determines its ability to absorb heat. The gas must, of course, be insoluble in water.

Thus, while some gases such as hydrogen for example have a very low density, they may also have a very high specific heat; while others such as argon have a low specific heat they have a relatively high density.

Since no gas presently available has optimum desired characteristics in all respects, a compromise must be made and air is an acceptable moisture carrier, particularly when its low cost and ready availability are considered. In this connection, one advantage of the present system is its independence of the atmospheric wet bulb temperature.

As an important feature of our present invention, we use the double cooling tower concept disclosed in the aforementioned application but we enclose the towers and maintain air within the enclosure as our moisture carrier. However, we carefully control the air pressure to maintain the same preferably below atmospheric pressure so as to reduce the weight of air serving as moisture carrier, thus also reducing the energy necessary to heat the air, as well as the film surface areas required in the towers, it being remembered that the ability of a gas to carry moisture depends upon its volume, not its weight. Therefore, while reducing the weight of air to be heated, we maintain its volume as defined by the enclosure.

Thus, we contribute a method and apparatus wherein saline water to be converted is heated and then brought into direct heat exchange contact with a selected atmosphere maintained at a predetermined sub-atmospheric pressure and having a temperature lower than the temperature of the heated water thus to increase the humidity of the atmosphere. The humidified atmosphere is then brought into heat exchange contract with a relatively cool medium thus lowering the temperature of the atmosphere to effect dehumidification thereof, and the fresh water thus extracted from the atmosphere is collected.

As a feature of our invention, we heat saline water to be converted and then effect cooling by humidification of a gas by the heated saline water by bringing a thin film of the water having a large surface area into intimate contact with a selected gas at controlled pressure. For this purpose we prefer to utilize a cooling tower of the type shown and described in United States Letters Patent No. 2,760,764, for example. By such means the gas is brought into counterflow contact with the water film and, due to its low partial pressure and the relative temperatures of the water and gas, becomes humidified to the point of saturation.

We then move the saturated gas through a second similar tower wherein a film of relatively cool fresh water is brought into intimate contact with the heated, saturated gas, under controlled pressure conditions. As the temperature of the saturated gas is lowered, dehumidification occurs and moisture is extracted from the gas in the form of fresh water. Naturally, the dehumidification occurs at the film surface of the cool fresh water introduced into the tower so that the volume of fresh water is actually increased as it moves through the tower. The net increase in fresh water represents the product of the system and may be taken off at a convenient point. The supply of fresh water may be cooled, and for this purpose we prefer to bring the fresh water into heat exchange relation with saline water to cool the fresh water before it is delivered to the second tower. A quantity of saline water may be taken from the source for this purpose.

It will be appreciated by those persons skilled in the art that adiabatic humidification and dehumidification of the gas occurs as the gas moves through the towers, the necessary heat exchange taking place between the heated saline water and the gas in the first instance, and between the cool fresh water and the saturated gas in the second. Accordingly, it is only necessary to supply energy to heat the saline water, operate a fan for moving the gas through the towers within the enclosure, and pump the saline and fresh water. In this connection, it will be noted that the pumping heads for towers of the type mentioned, and consequently the power requirement for pumping is relatively small.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawing, forming a part of the specification, wherein:

FIG. 1 is a schematic view of a system in accordance with the present invention; and FIG. 2 is a perspective view, partly broken away, illustrating the structure and operation of the towers.

Referring now to the drawing, and more particularly to FIG. 1 thereof, there is shown a system in accordance with the present invention wherein sea or brackish water, for example, is made to flow in a closed cycle by means of a pump 10 through an intake pipe 11 to a heat source 14 for raising the temperature of the water. In the embodiment shown, we have chosen to illustrate the heat source as a steam condenser for condensing exhaust steam from a turbine 15 constituting a portion of a conventional steam power plant, although it will be understood that any suitable type of heat source may be utilized, it being our intention here to emphasize the facility with which the present system may be integrated with existing or proposed power plants to utilize the condenser heat load which is otherwise normally wasted.

After having its temperature raised by the heat source, the saline water passes through pipe 16 to a first cooling tower indicated generally by the reference numeral 17 and constructed in accordance with the teachings of the aforementioned United States Letters Patent No. 2,760,764, where it is disposed in thin film attitude and comes into surface contact with the gas moving in counterflow with the water. By reason of its contact with the water film, the gas becomes saturated with moisture in a manner to be described hereinafter, and the saline water leaves the tower 17 through pipe 19 and is returned to the heat source to repeat the cycle thus assuring utilization of the total available heat load. The pump 10 will, of course, provide all necessary make up water.

A second cooling tower 20 is superposed immediately atop the tower 17 and is similar in all respects to it. As indicated by the arrows, saturated gas leaving the tower 17 is drawn up through the tower 20 by a fan 21 positioned at the top of tower 20. However, fresh water is disposed in film attitude in tower 20 for surface contact with the saturated gas to cool same and effect dehumidification thereof. The fresh water enters the tower 20 through a pipe 22 and leaves through pipe 24, the net increase in the fresh water by reason of the dehumidification of the saturated gas constituting the product of the system and being tapped off pipe 24 through a further pipe 25. The remainder of the fresh water is delivered through pipe 26 to a heat exchange unit 27 wherein it is cooled by saline water supplied by conventional power condenser pump 23 through pipe 29 and run through the exchanger to a saline water discharge pipe 28 which returns it to its source. The fresh water is delivered to the exchanger coil 30 and, after being thus cooled, is ready for recirculation to the tower 20.

As has already been stated, the towers 17 and 20 are contained within an outer envelope 31 within which the towers are supported upon pedestals 32 and through which the pipes 16, 19, 22 and 24 pass to their respective towers. The upper portion of the envelope above the fan 21 is provided with a centrally disposed deflector 33 for directing the gas drawn up through the towers outwardly to large conduits formed by the envelope 31 and the outer surfaces of the towers 17 and 20, the latter of which merge with curved conduit elements 34 joining with the sides of the fan housing. A further deflector 35 is centrally positioned at the lower region of the envelope to deflect the gas upwardly into the tower 17. Thus, the gas is continuously circulated up through the towers and then downwardly to repeat the excursion.

Referring now to FIG. 2, it will be seen that the towers 17 and 20 may, for example, have closed, endless main troughs 129, intermediate troughs 130 and closely spaced distributing channels 131. The main troughs of the lower and upper towers receive water which flows to the intermediate troughs and the distributing channels from which it overflows and runs down along the sides thereof and down the sides of the film plates 132 therebeneath, thus being presented to the spaces between the channels in thin film disposition.

Each tower has collecting troughs 135 positioned one each beneath and coextensive with the film plates for collecting the water that reaches the lower region of the respective plates. These collecting troughs are in fluid flow communication with return troughs 136 which are in turn connected with return pipes 19 and 24, respectively.

A more detailed description of the construction and operation of the cooling towers will, of course, be found in the aforementioned patent, but we have here presented the foregoing brief description thereof to assist in an understanding of our present concept.

In operation, the water to be converted is pumped through the line 11 to a heat source such as the condenser 14, where it is heated to a temperature well above the temperature of the gas within the envelope 31 after dehumidification thereof. It next flows through the pipe 16 to the first or lower tower 17 where it is disposed in thin film attitude and brought into direct heat exchange contact with the selected gas moving in counterflow relation to it. It will be understood by those persons skilled in the art that at the very area of contact, water vapor separates from the warm water and humidifies the gas, thus increasing the partial pressure of that portion of the gas in intimate contact with the water until it becomes saturated. Because the gas further removed from the water is low in vapor and has a relatively low partial pressure, the saturated portion of gas at high partial pressure begins to diffuse moisture vapor into the gas at the lower partial pressure. This process continues until, upon leaving the first tower, the gas is substantially saturated, or at about one hundred precent relative humidity.

The heated saline water that is not carried off by the gas as humidity reaches the return trough 136 of the lower tower 17 in the manner described and is returned via the pipe 19, pump 10 and pipe 11 to the heat source.

The humidified gas, upon leaving the lower tower, is drawn upwardly and passes between the film plates 132 of the upper tower 20. As mentioned, these film plates serve to present thin films of cool fresh water to the gas. It will be appreciated that at the very region of surface contact of the gas and water, the saturated gas is cooled and, while its relative humidity remains constant at substantially one hundred percent, its absolute humidity drops as moisture condenses on the surface of the cool water. This, in turn, effects a reduced partial pressure of the gas at the contact region and the moisture in the gas commences to diffuse towards the contact region and as it is cooled, converts to fresh water and runs down the film plates along with the circulating fresh water. The moisture thus released as fresh water joins the fresh water being circulated through the tower thus to increase its volume. As mentioned before, the fresh water moves to the fresh water return trough 136 and out through pipe 24, the net increase being tapped off through pipe 25, and the remainder being recirculated through the heat exchange unit 27 and back to the tower 20.

By way of example, assuming a temperature of saline water of 65° F., if a steam condenser is utilized as a heat source, it may also be assumed that the condenser vacuum is 2 in. Hg. corresponding approximately to a saturation temperature of 101° F. The saline water may very well leave the condenser at 96° F.

In this case, the air moving through the tower 17 is in a closed cycle, that is, its temperature leaving the fresh water or upper tower must equal its temperature entering the first or lower tower. The air temperature is of course determined by the saline water temperature and must be above it, say at 75° F. The air may cool the saline water to a 5° F. approach, that is to 80° F. and itself will absorb moisture and be heated, leaving the lower tower at say 91° F. and saturated.

The cool fresh water may arrive at the upper tower at 70° F. to be heated by the saturated air to 86° F., for example, the air cooling to 75° F. saturated while its excess water condenses on the fresh water film surfaces, as explained. The fresh water product is taken off to storage through pipes 24 and 25. It will of course be appreciated that the efficiency of the system is inversely proportional to the pressure maintained within the enclosure; that is, the lower the pressure the more efficient will be the operation of the present system.

For a specific installation where the economic factors are known for the power plant, if one is used as the heat source, where the value of fresh water is established and where environmental conditions such as circulating water temperatures are determined, and engineering optimization will enable those skilled in the art to arrive at values, such as those previously assumed, which will lead to the most economical plant. By standard methods of calculation, the size and cost of the equipment requirements and the value of the extra power requirements will permit the predetermination of the final cost of the fresh water produced by our process for a specific installation.

From the foregoing description, it will be seen that we have conceived a novel system of converting saline water to potable fresh water which system represents an improvement over that described in application Serial No. 109,648. We have thus considerably reduced the overall conversion cost by providing a more efficient system involving minimal operating maintenance cost.

We believe that the construction and operation of our novel conversion system will now be understood, and that the advantages of our invention will be fully appreciated by those persons skilled in the art.

We now claim:

1. A saline water purification system comprising an enclosure containing a gaseous atmosphere, pressure control means associated with said enclosure and operative to maintain said gaseous atmosphere at a selected sub-atmosphere pressure, means operative to move the gaseous atmosphere through a circular path upwardly in one portion of said enclosure and downwardly in another portion, a first cooling tower located within said enclosure and said one portion, means operative to heat saline water to a temperature in excess of the temperature of the gaseous atmosphere within said enclosure and to convey the so heated saline water to said first cooling tower to flow downwardly through said tower in thin film attitude in counterflow direct surface contact with the upwardly moving gaseous atmosphere to heat same and become partially evaporated to humidify the so heated atmosphere, means arranged to convey unevaporated saline water from said first cooling tower out from said enclosure, a second cooling tower disposed within said enclosure above said first cooling tower, means operative to supply fresh water at a temperature below the temperature of the so heated gaseous atmosphere to said second cooling tower also to flow downwardly through said second tower in thin film attitude in counterflow direct surface contact with the upwardly moving heated and humidified gaseous atmosphere to cool same and to cause dehumidification thereof with consequent increase in the volume of said fresh water and means operative to extract from said second cooling tower an amount of fresh water equal to said increase in volume.

2. A sea water purification system comprising an enclosure containing air, pressure control means associated with said enclosure and operative to maintain the air therein at a selected sub-atmospheric pressure, means operative to move said air through a circular path upwardly in one portion of said enclosure and downwardly in another portion, a first cooling tower located within said enclosure at said one portion, heating means operative to heat saline water to a temperature in excess of the temperature of the air within said enclosure and to convey the so heated sea water to said first cooling tower to flow downwardly through said first tower in thin film attitude in counterflow direct surface contact with the upwardly moving air to heat the air and at the same time to become partially evaporated to humidify the so heated air, means arranged to convey unevaporated sea water from said first cooling tower out from said enclosure, a second cooling tower disposed within said enclosure above said first cooling tower, means operative to supply fresh water at a temperature below the temperature of the so heated air to said second cooling tower also to flow downwardly through said second tower in thin film attitude in counterflow direct surface contact with the upwardly moving heated and humidified air to cool the air and to cause dehumidification thereof with consequent increase in volume of the fresh water, means operative to convey said fresh water in physically isolated heat exchange relationship with said sea water at a point in advance of said heating means and means operative to extract from said second cooling tower an amount of fresh water equal to said increase in volume.

References Cited by the Examiner

UNITED STATES PATENTS

| | | | |
|---|---|---|---|
| 236,940 | 1/81 | Faesch | 202—49 X |
| 585,365 | 6/97 | Skiffington. | |
| 614,776 | 11/98 | Stocker | 202—49 |
| 948,432 | 2/10 | Rudeen. | |
| 1,379,502 | 5/21 | DeWoern. | |
| 1,493,756 | 5/24 | LaBour | 202—49 X |
| 1,544,130 | 6/25 | Christensen. | |
| 1,918,638 | 7/33 | Gensecke. | |
| 2,018,049 | 10/35 | Allen | 202—49 X |
| 2,305,408 | 12/42 | Clemens. | |
| 2,368,665 | 2/45 | Kohman et al. | 202—49 |

(Other references on following page)

UNITED STATES PATENTS

| | | | |
|---|---|---|---|
| 2,372,846 | 4/45 | Nettel et al. | |
| 2,444,527 | 7/48 | Pomeroy | 202—48 X |
| 2,507,632 | 5/50 | Hickman. | |
| 2,514,944 | 7/50 | Ferris et al. | 202—236 |
| 2,696,465 | 12/54 | Kittredge | 202—75 X |
| 2,915,462 | 12/59 | Salmon. | |

FOREIGN PATENTS 1,244,930   9/60   France.

OTHER REFERENCES

German application, K24930 Ia/17a, 12/56.

NORMAN YUDKOFF, *Primary Examiner.*

ALPHONSO SULLIVAN, *Examiner.*